United States Patent
Dohi

(10) Patent No.: US 10,459,320 B2
(45) Date of Patent: Oct. 29, 2019

(54) PORTABLE PRINTER

(71) Applicant: TOMY Company, Ltd., Tokyo (JP)

(72) Inventor: Masahiro Dohi, Tokyo (JP)

(73) Assignee: TOMY COMPANY, LTD., Tokyo (JP)

( * ) Notice: Subject to any disclaimer, the term of this patent is extended or adjusted under 35 U.S.C. 154(b) by 0 days.

(21) Appl. No.: 15/989,313

(22) Filed: May 25, 2018

(65) Prior Publication Data

US 2019/0011810 A1    Jan. 10, 2019

(30) Foreign Application Priority Data

Jul. 10, 2017  (JP) ................. 2017-134332

(51) Int. Cl.
| | |
|---|---|
| *G03B 17/56* | (2006.01) |
| *G03B 17/48* | (2006.01) |
| *H04N 1/00* | (2006.01) |
| *H04N 5/225* | (2006.01) |
| *H04N 5/232* | (2006.01) |
| *H04N 5/235* | (2006.01) |

(52) U.S. Cl.
CPC .......... *G03B 17/561* (2013.01); *G03B 17/48* (2013.01); *H04N 1/00* (2013.01); *H04N 5/2251* (2013.01); *H04N 5/2353* (2013.01); *H04N 5/23248* (2013.01)

(58) Field of Classification Search
USPC ................................. 396/419, 428
See application file for complete search history.

(56) References Cited

U.S. PATENT DOCUMENTS

| | | | |
|---|---|---|---|
| 6,963,359 B1 * | 11/2005 | Aosaki | G03B 17/52 348/207.2 |
| 2002/0031342 A1 * | 3/2002 | Sasaki | G03B 17/50 396/30 |
| 2005/0179731 A1 * | 8/2005 | Omura | H04N 1/2112 347/50 |

FOREIGN PATENT DOCUMENTS

| | | |
|---|---|---|
| JP | 11-167161 A | 6/1999 |
| JP | 2001-45342 A | 2/2001 |
| JP | 4140047 B2 | 8/2008 |

* cited by examiner

*Primary Examiner* — Clayton E. LaBalle
*Assistant Examiner* — Warren K Fenwick
(74) *Attorney, Agent, or Firm* — IP Business Solutions, LLC

(57) ABSTRACT

A portable printer includes a camera, a printing part, a supporting part, and a mirror. The supporting part is configured to support a portable electronic device including a display, in a way in which the display faces the camera with a predetermined distance away from the camera. The support member is configured to cover a space between the portable electronic device and the camera. The mirror is configured to reflect an image on the display and form reflected image thereon. The reflected image on the mirror is viewable by a user. The camera is configured to capture the image on the display. The printing part is configured to print the image captured by the camera.

11 Claims, 7 Drawing Sheets

PORTABLE PRINTER

CROSS-REFERENCE TO RELATED APPLICATIONS

The present application claims priority under 35 U.S.C. 119 to Japanese Patent Application No. 2017-134332, filed on Jul. 10, 2017. The contents of this application are incorporated herein by reference in their entirety.

BACKGROUND OF THE INVENTION

Field of the Invention

The present invention relates to a portable printer.

Description of the Related Art

As a method for printing a film at a spot without bringing a smartphone, etc., which takes an image or sends data, back to a home or a store, for example, there is a portable telephone as described in Japanese Patent Application Publication No. 2001-45342. The smartphone itself may include an instant camera function. However, this method cannot be used in a smartphone in which the instant camera function is not available for a user.

On the other hand, there is a printing method for an electronic camera. As described in Japanese Patent Application Publication No. H11-167161, it is well-known that there is a printing device with the electronic camera being plugged to a socket in a state in which an image is displayed on a display of the electronic camera, and the image displayed on the display is projected to a film through an internal optical system, so that the film is exposed and printed.

Further, there is a printing method for a portable telephone. As described in Japanese Patent No. 4140047 (see, specifically, FIG. 27 described below), it is well-known that there is a portable printer with the portable telephone being plugged to a socket in a state in which an image is displayed on a display of the portable telephone, and in the same manner described above, the image displayed on the display is projected to a film through an internal optical system, so that the film is exposed and printed.

If these technologies are applied to a smartphone, it may be possible to print an instant image, which is displayed on a display of the smartphone and is viewed by a user, on a film at a spot.

However, in the portable printers, etc. described in Japanese Patent Application Publication No. H11-167161 and Japanese Patent No. 4140047, there is a case in which a film is exposed in the inner part, so that in order not to enter external light, the devices are covered by a wall surface or a bellows which prevents the light from entering. In order not to enter the external light inside the devices, the smartphone, which is plugged to a socket, is pressed onto the wall surface, and the smartphone, which is inserted to the slot, is sealed.

Therefore, in the state in which the smartphone is inserted into the socket of the portable printer, etc. and the display is in contact with the wall surface, or in the state in which the smartphone is inserted to the slot, the user cannot confirm whether the image is appropriately displayed on the display of the smartphone (that is, whether the image, which is expected to be printed, is displayed, whether a position or vertical or horizontal directions of the image are appropriate, or on the contrary, whether the image is displayed, etc.).

Therefore, even though an image is not appropriately displayed on the display, the image is printed. After that, the user realizes the error, so that the user feels inconvenience and the printed film is wasted.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the aforementioned problems. An object is to provide a portable printer which is capable of appropriately printing an image displayed on a display while the user confirms whether the image is appropriately displayed on the display of a portable electronic device such as a smartphone, etc.

In some embodiments of the present disclosure, a portable printer includes a camera, a printing part, a supporting part, and a mirror. The supporting part is configured to support a portable electronic device including a display, in a way in which the display faces the camera with a predetermined distance away from the camera. The support member is configured to cover a space between the portable electronic device and the camera. The mirror is configured to reflect an image on the display and form reflected image thereon. The reflected image on the mirror is viewable by a user. The camera is configured to capture the image on the display. The printing part is configured to print the image captured by the camera.

In some embodiments of the present disclosure, a portable printer includes a camera, a printing part, an installation part to which the camera is installed, a supporting part, and a mirror. The supporting part is configured to support a portable electronic device including a display in a way in which the display faces the camera with a predetermined distance away from the camera. The camera is configured beneath the portable electronic device. The support member is configured to cover a space between the portable electronic device and the camera. The mirror is configured to reflect an image on the display and form a reflected image thereon. The reflected image on the mirror is viewable by a user. The camera is configured to capture the image on the display. The printing part is configured to print the image captured by the camera.

In some embodiments of the present disclosure, in the portable printer, the camera and the printing part are formed in a unified manner, and the camera and the printer are installed in the installation part.

In some embodiments of the present disclosure, in the portable printer, a shutter button is configured at the installation part for the user operate to a shutter function of the camera In some embodiments of the present disclosure, in the portable printer, the supporting part is foldable.

In some embodiments of the present disclosure, in the portable printer, the supporting part is configured to cover the installation part from a top thereof when the supporting part is folded.

In some embodiments of the present disclosure, in the portable printer, a surface of the mirror is convex.

In some embodiments of the present disclosure, in the portable printer, a first frame includes a first opening part. The first frame is supported by the supporting member, and the first frame is configured to trim the image on the display.

In some embodiments of the present disclosure, in the portable printer, the frame includes an adhering part, and the portable electronic device is attached to the frame at the adhering part.

In some embodiments of the present disclosure, in the portable printer, the supporting part is foldable and the frame is configured to be stored between the installation part and the supporting part when the supporting part is folded.

In some embodiments of the present disclosure, in the portable printer, a second frame includes a second opening part. At least one of a shape and a size of the second opening is different respectively from a shape and a size of the first opening.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

DETAILED DESCRIPTION

Figure 1:
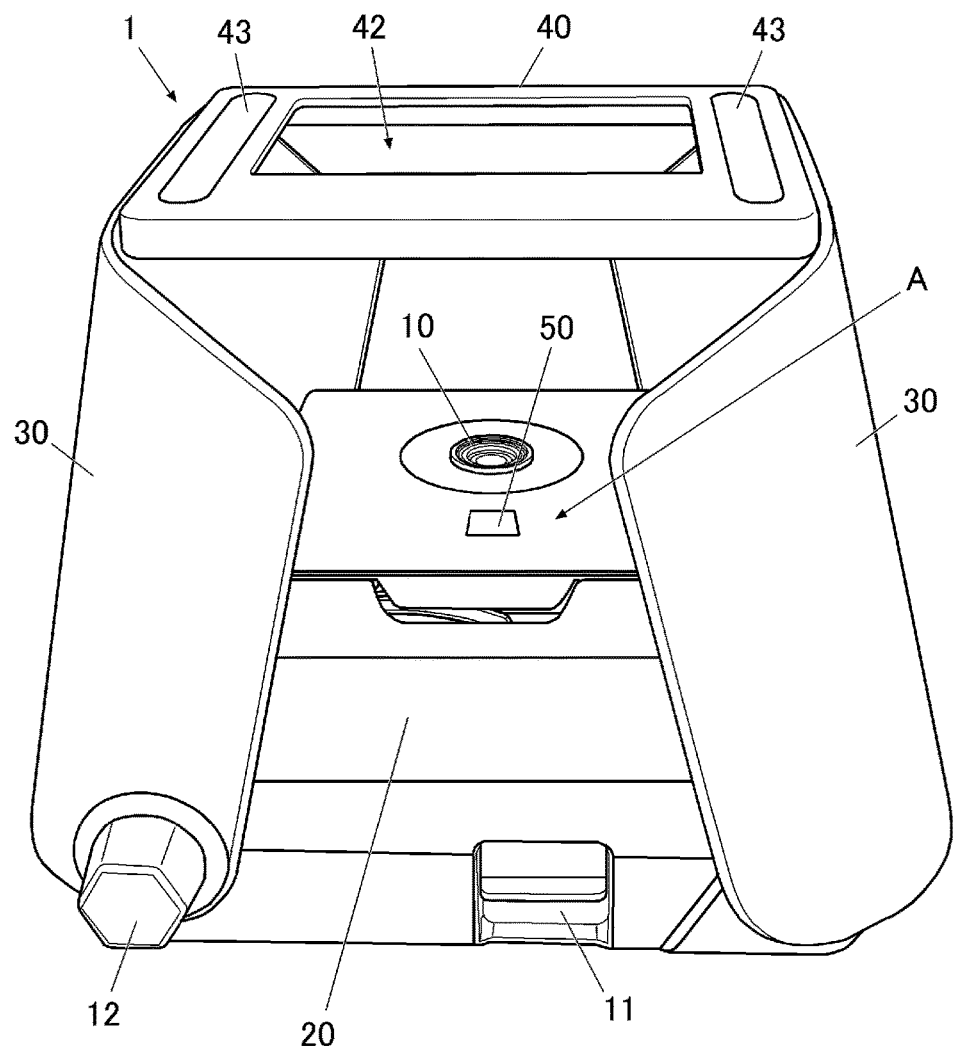
FIG. 1 is a perspective view showing a configuration of a portable printer according to a first embodiment.

In the following paragraphs, some embodiments of the invention will be described by way of example and not limitation. It should be understood based on this disclosure that various other modifications can be made by those in the art based on these illustrated embodiments.

Hereinafter, a portable printer of the present invention will be described based on embodiments shown in the drawings.

The portable printer is provided with an instant camera (a camera with a printing function), supporting parts supporting a portable electronic device, and a mirror. The portable electronic device includes a display positioned in a direction opposite to the instant camera and the display is separated with a predetermined distance from the instant camera. The supporting parts cover a space between the portable electronic device and the instant camera. The mirror reflects an image, which is displayed in the display of the portable electronic device supported by the supporting parts, by the reflection through the supporting parts. The image on the mirror is viewable by the user from an observation window which is formed on or by the supporting parts in a space between the portable electronic device and the instant camera. It is possible to take the image displayed on the display of the portable electronic device by the instant camera and print it out.

In each of the following embodiments, the portable electronic device is explained as a smartphone. However, the portable electronic device is not limited to the smartphone, but also a mobile phone, a game device, a portable information terminal, etc. As long as a portable electronic device has a display such as a liquid crystal display, etc., it is possible to apply the present invention.

Figure 5:
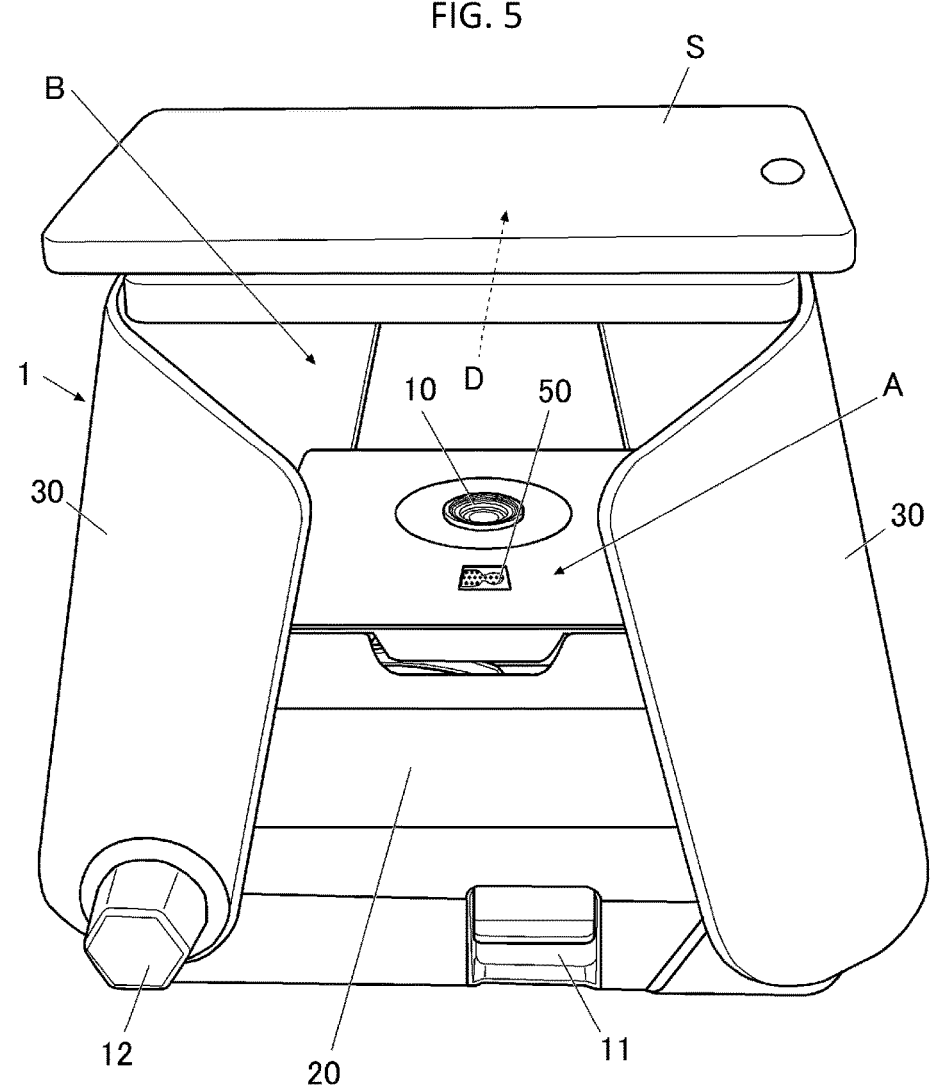
FIG. 5 is a perspective view showing a state in which the smartphone is mounted on the portable printer according to the first embodiment.
Figure 6:
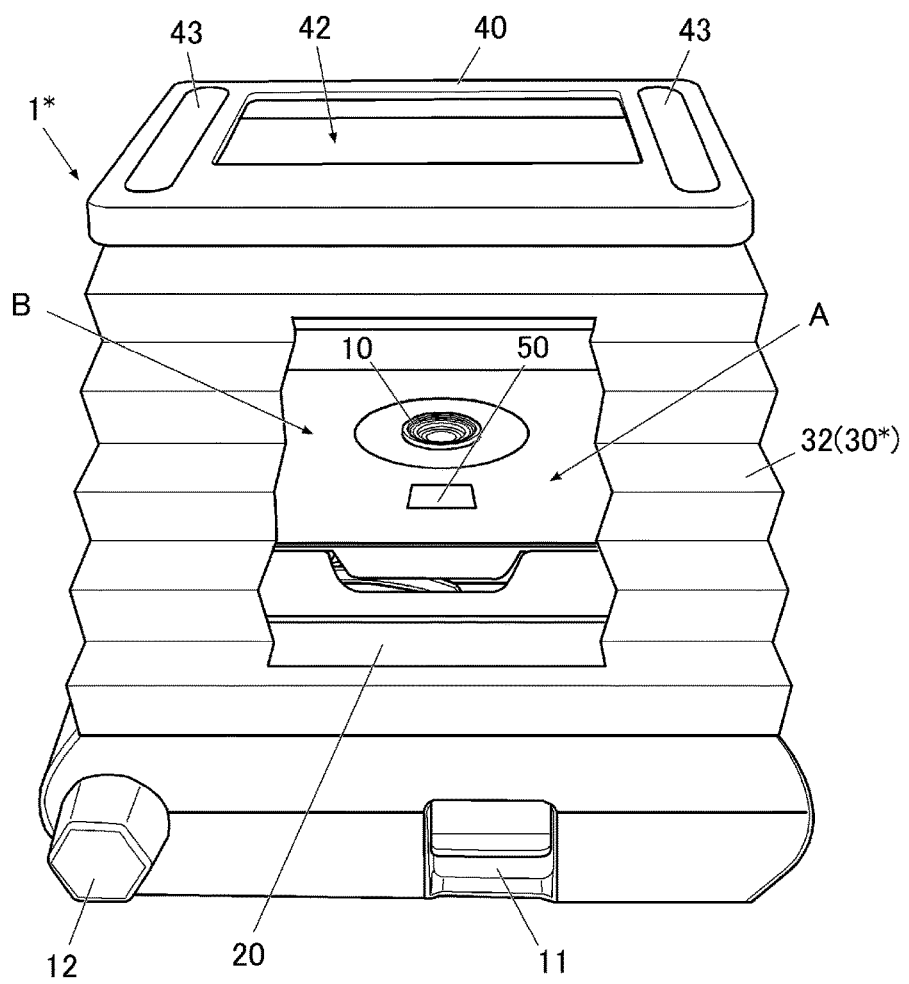
FIG. 6 is a perspective view showing a configuration of a portable printer according to a second embodiment.

In each of the following embodiments, for example, as shown in FIGS. 5 and 6 etc., which will be described later, (a smartphone S is omitted in FIG. 6), the smartphone S (portable electronic device) is positioned in the upper side, and an instant camera 10 is positioned in the lower side, so that the portable printer 1 is positioned on top of a desk, etc. However, the portable printer 1 of the present invention may be used in, for example, a holding state by a hand, etc. instead of the installed state. In this case, it is not necessarily limited to use in a state in which the smartphone S is positioned in the upper side and the instant camera 10 is positioned in the lower side. However, the relative position relationship or direction, etc. of each of the members configuring the portable printer 1 of the smartphone S (portable electronic device) or the instant camera 10, etc. corresponds to the relative position relationship or the direction, etc. described below. The instant camera 10 is a combination of a camera and a printing section which may be provided in a unified manner (or in one piece). However, the camera and the printing section may be separately provided.

[First Embodiment]
[Structure of Portable Printer]

FIG. 1 is a perspective view showing the configuration of the portable printer according to the first embodiment.

In the explanation of each part of the portable printer 1, the terms "up", "down", "left", "right", "front", and "back" refer to the corresponding directions in FIG. 1. Further, in the present embodiment, as shown in FIG. 1, the portable printer 1 is explained in a case in which the instant camera 10 is integrally installed in the installation part 20. However, it is possible to configure that the instant camera 10 is detachable from the installation part 20 as a separate part between the instant camera 10 and the installation part 20.

In the present embodiment, a shutter button 11 of the instant camera 10 is provided on the front side of the installation part 20 for operating a shutter function. Further, inside the instant camera 10 (inside the installation part 20), a film pack (not shown) storing a predetermine number of films can be set. By rotating a handle 12 provided in the front side of the installation part 20, a film (not shown), in which an image is taken by the instant camera 10 by pressing down the shutter button 11, can be taken (printed out) outside from an extracting port 13 (see FIG. 2 which will be described later) provided in the side surface of the installation part 20. The extracting part 13 is a part of a printing section of the portable printer 1.

By the configuration in which the shutter button of the instant camera 10 is pressed by pressing down the shutter button 11, the portable printer 1 or the instant camera 10 is not moved in a horizontal direction (right and left direction or front and back direction) even when the shutter button 11 is pressed down, so that it has an effect that a taken image is prevented from blurring.

In the right and left ends of the installation part 20, supporting parts 30, 30 are rotatably (foldable) installed, respectively. That is, in the present embodiment, the supporting parts 30, 30 can be opened or folded as, so called, double doors with respect to the installation part 20.

In the present embodiment, in an opening state (see the lower part of FIG. 3 which will be described later), the supporting part 30, 30 stand themselves unless the user applies force to fold it. Further, when the user applies force to fold it, the supporting parts 30, 30 are configured to be easily folded.

Figure 2:
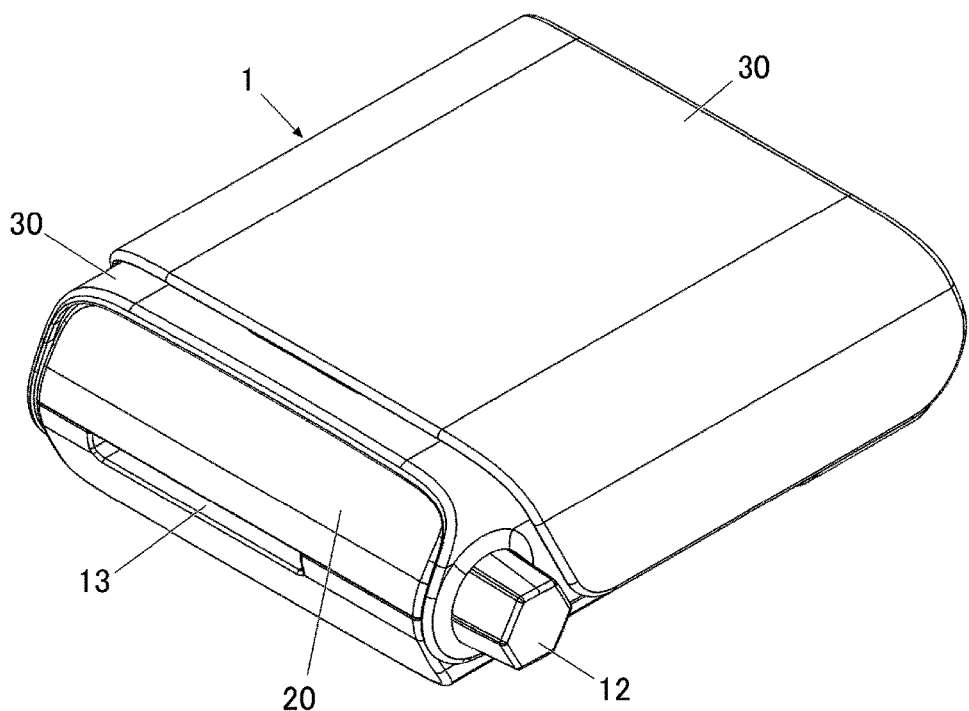
FIG. 2 is a perspective view showing a state in which both supporting parts of the portable printer are folded on a top of an installation part.

In the present embodiment, the supporting parts 30, 30 are formed as a plate. As shown in FIG. 2, in a state in which the supporting parts 30, 30 are folded on the top of the installation part 20, the front and back end parts of each of the supporting parts 30, 30 are bent downwardly as hanging down.

In this embodiment, by such configuration of the supporting parts 30, 30, in the folding state with respect to the installation part 20, the supporting parts 30, 30 are configured as a lid to cover the installation part 20. By such configuration in which the supporting parts 30, 30 can be folded as a lid to cover the installation part 20 in the folding state, the portable printer 1 makes it easier for a user to carry, and it is possible that the installation part 20 and the instant camera 10 are protected from an external impact by the lid (supporting parts 30, 30) when the user carry. Further, by the configuration in which the folded supporting parts 30, 30 become a lid, it is possible to prevent the lens of the instant camera 10 from damaging or getting dirty, etc. Therefore, it has an effect that the lens of the instant camera 10 is protected by the lid (supporting parts 30, 30).

Figure 3:
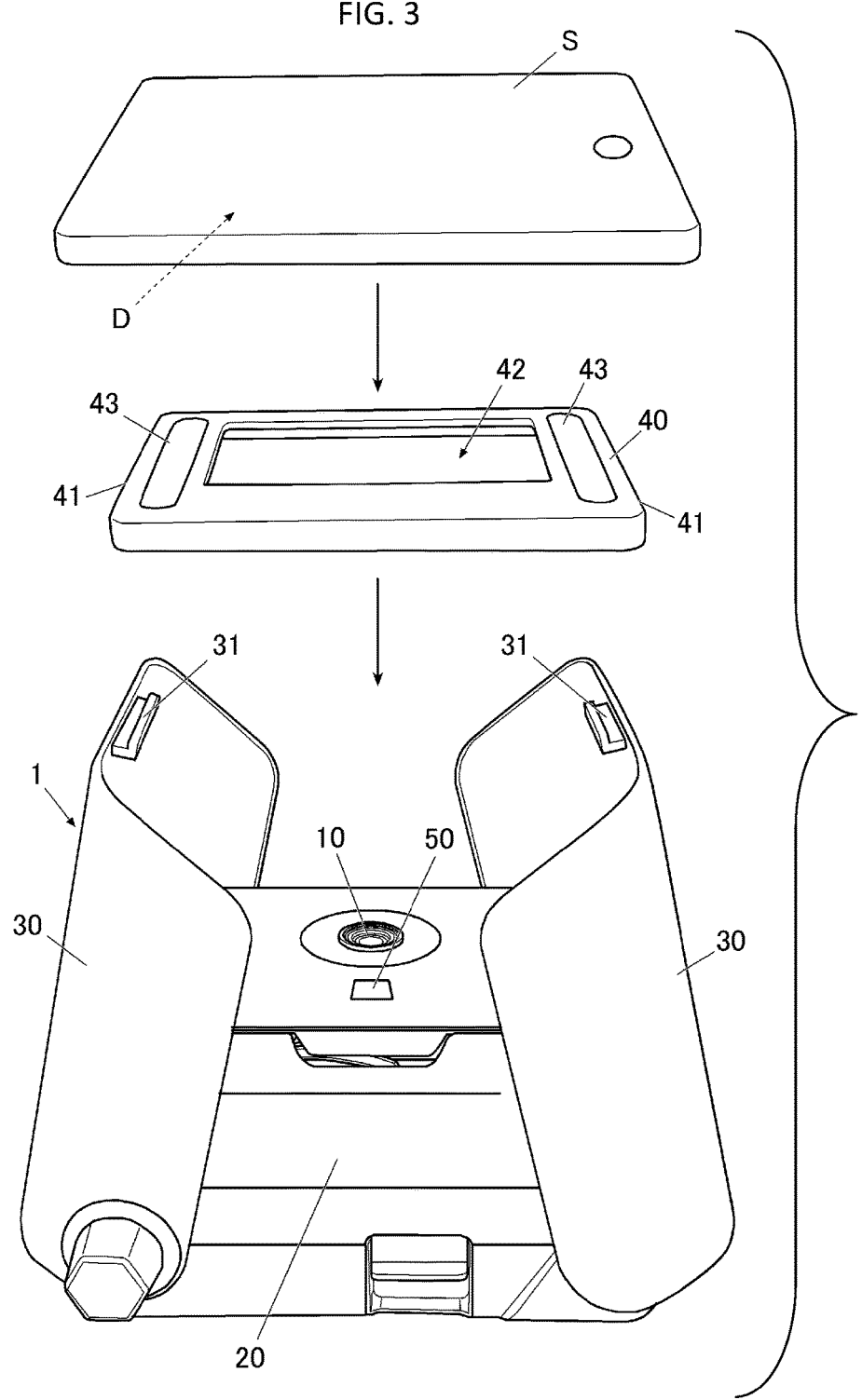
FIG. 3 is an illustration showing a state in which a smartphone is mounted on a frame and it is mounted on the upper end of the supporting parts of the portable printer.

It may be configured in which the smartphone is installed across each upper end of the supporting parts 30, 30 in the standing state of the supporting parts 30, 30 from the installation part, that is, the opening state (see FIG. 1). However, in the present embodiment, as shown in FIG. 3, a frame 40 at which the display D of the smartphone S is installed is mounted on the upper end of the supporting parts 30, 30 in a state in which the display D of the smartphone S is directed downwardly. In this way, the smartphone S of which the display D is directed downwardly (that is, a direction facing the instant camera 10) by the supporting parts 30, 30 through the frame 40 is supported on the upper side of the instant camera 10.

It is also possible to directly install the smartphone S to the supporting parts 30, 30 in the state of the downward direction without the frame 40.

In the case of the present embodiment, as shown in FIG. 3, engaging parts 31, 31 provided in the upper end side of the supporting parts 30, 30 and engaging parts 41, 41 of the frame 40 side are engaged, so as to secure the frame 40 to the supporting parts 30, 30. In this way, the frame 40 and the smartphone S can be supported by the supporting parts 30, 30 in a stable manner. Also, the smartphone S of which the display D is directed downwardly is supported in a state of separating in an upper side with a predetermined distance from the instant camera 10 by the supporting parts 30, 30. With such structure, by supporting the smartphone S of which the display D is directed downwardly in a state separating in the upper side with a predetermined distance from the instant camera 10, the display D of the smartphone S is arranged in a position where the instant camera 10 can focus.

Further, in the present embodiment, in the frame 40, an adhering part 43 is provided in the vicinity of the opening part 42, so that the smartphone S is mounted on the frame 40 by adhering to the adhering part 43.

FIGS. 1 and 3 show a case in which the adhering part 43 is provided in each of the right and left sides of the opening part 42. However, it may be provided in the front and back sides of the opening part 42 or the surrounding of the opening part 42. Therefore, it may be provided in a suitable position thereon. Further, for example, a suction disk, etc. may be provided on the frame 40 so as to secure the smartphone S to the frame 40 by the suction. Also, the smartphone S may be fastened by a band, or a fastener may be provided in the frame and the smartphone S may be fastened by the fastener. It is not limited to the adhering part to install the smartphone S to the frame 40 as long as the smartphone S is not separated from the frame 40.

Figure 4:
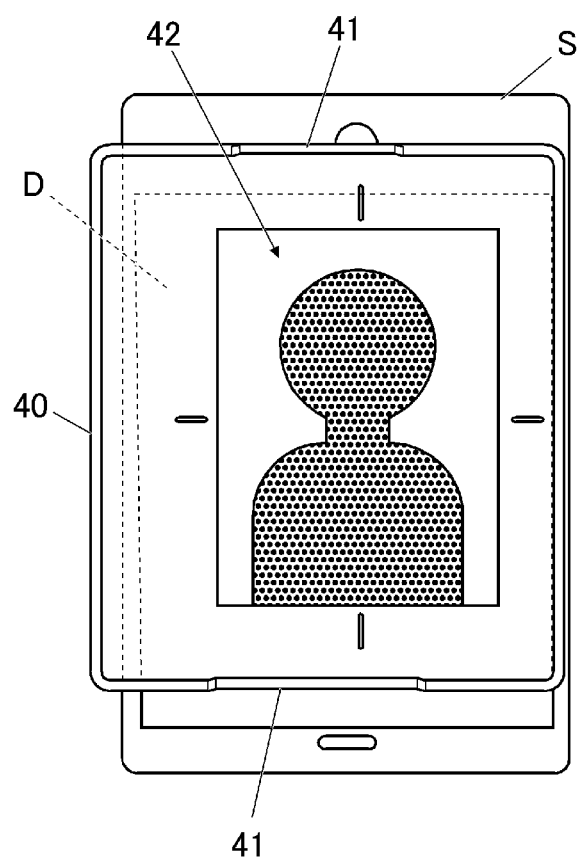
FIG. 4 is an illustration showing a state in which the smartphone is mounted on the frame and an image displayed on the display of the smartphone is trimmed by an opening part of the frame, etc.

When the smartphone S is installed on the frame 40, as shown in FIG. 4, an image displayed on the display D of the smartphone S is trimmed by the opening part 42 of the frame 40. That is, among the image displayed on the display D of the smartphone S, a part of the image is extracted (or cropped) by the opening part 42 of the frame 40, and other than the extracted part is shielded by the frame 40. Therefore, when the smartphone S is installed on the frame 40 in a state in which an image desired for printing is displayed on the display D of the smartphone S, the user installs the smartphone S to the frame 40 in a state in which a part of the image desired for printing is appropriately displayed within the opening part 42 of the frame 40.

In the present embodiment, in this way, the image displayed on the display D of the smartphone S by the opening part 42 of the frame 40 becomes the trimming state. Therefore, for example, it is possible to prepare a plurality of frames 40 which have different shapes or sizes (any one of them or both of them) of the opening part 42, so that a range for trimming an image can be appropriately changed by changing the frames 40.

Further, as shown in FIG. 2, in the folding state in which the supporting parts 30, 30 are folded on the top of the installation part 20, the frame 40 may be stored between the supporting parts 30, 30 in the folding state of the installation part 20 and the instant camera 10. In this configuration, when the portable printer 1 is carried in the state in which the supporting parts 30, 30 are folded, it is not necessary to carry the frame 30 separately. Therefore, it is possible to carry the frame stored in the portable printer 1, and it is convenient to carry the portable printer 1 for the user.

On the other hand, in the present embodiment, as shown in FIG. 1, etc., a mirror 50 is provided in the vicinity of the instant camera 10. As shown in FIG. 5, the mirror 50 is used for the user to view an image displayed on the display D of the smartphone S, which is supported by the supporting parts 30, 30, by the reflection.

The mirror 50 may be installed in any one of the instant camera 10 and the installation part 20.

In the present embodiment, as described above, two supporting parts 30, 30 open and stand as opening double doors with respect to the installation part 20, so that a space B between the smartphone S and the instant camera 10 is covered, and an opening between the smartphone S and the instant camera 10 is formed by the supporting parts 30, 30 and the opening becomes an observation window A (see FIGS. 1 and 5). The mirror 50 reflects an image displayed on the display D of the smartphone S, which is supported by the supporting parts 30, 30, and the user can view the image through the observation window A.

In a case, it is preferable that the mirror surface of the mirror 50 is formed as a convex surface, that is, a convex mirror. With this structure, even though the mirror 50 is relatively small, it is possible the user to view the entire image displayed on the display D of the smartphone S (image actually in a range trimmed by the opening part 42 of the frame 40 among the image displayed on the display D of the smartphone S) by reflecting on the mirror 50.

In this way, the portable printer 1 according to the present embodiment can take an image displayed on the display D of the smartphone S, which is supported downwardly by the supporting parts 30, 30, by the instant camera 10 and can print the image.

[Procedures for Printing an Image by Portable Printer]

Next, it will explain the procedures to take and print an image displayed on the display D of the smartphone S by the portable printer 1 according to the present embodiment, and further, it will explain the effects of the portable printer 1 according to the present embodiment.

First, the user selects and displays an image for printing on the display D of the smartphone S. The portable printer 1 in the state in which the lid is closed (see FIG. 2) is placed on a desk, etc., and the lid, that is, the supporting parts 30, 30 of the portable printer 1 opens and stands by being rotated with respect to the installation part 20 (see the lower side of FIG. 3).

The frame 40 is taken out, and as shown in FIG. 4, the display D part of the smartphone S is mounted on the frame 40. In the case of the present embodiment, the smartphone S is installed on the frame 40 by adhering the display D of the smartphone S to the adhering parts 43 of the frame 40. At this point, in order to appropriately display an image for printing within the opening part 42 of the frame 40, a magnification rate of the image is adjusted or the positions, etc. of the image are adjusted on the display D.

In a state in which the display D of the smartphone S is positioned downwardly, the frame 40 and the smartphone S are fastened to the supporting parts 30, 30 by engaging the engaging parts 41, 41 of the frame 40 and the engaging parts 31, 31 of the supporting parts 30, 30.

At this point, in the present embodiment, the image displayed on the display D of the smartphone S, which is supported by the supporting parts 30, 30, is reflected on the mirror 50, and the image can be viewed by the user through the observation window A (see FIG. 5) formed between the smartphone S and the instant camera 10 by the supporting parts 30, 30.

Therefore, the user can confirm whether the image displayed on the display D of the smartphone S is appropriate by viewing the image reflected on the mirror 50. That is, the user can confirm whether the image for printing is displayed (whether an image different from the desired image is displayed by mistake such as touching a screen erroneously when the smartphone S is fastened to the supporting parts 30, 30) or whether the positions or the vertical and horizontal directions of the image are appropriate (whether the positions or the directions of the image are changed by mistake) or on the contrary, whether an image is displayed (whether displaying an image is not terminated by mistake), etc. While confirming the above points by the user, it is possible that the frame 40 and the smartphone S are fastened to the supporting parts 30, 30.

Further, after the frame 40 and the smartphone S are fastened to the supporting parts 30, 30, the user can confirm and check that the image desired for printing is appropriately displayed within the opening part 42 of the frame 40 by viewing the image which is reflected on the mirror 50.

In addition, in the portable printer 1 according to the present embodiment, the user can perform confirming the image while viewing the image reflected on the mirror 50 every time without removing the smartphone S from the frame 40 and the supporting parts 30, 30, so that it is very convenient for the user.

Based on such confirmation viewing through the mirror 50 as described above, the user presses the shutter button 11 of the instant camera 10 and takes the image. A film is taken out from the extracting port 13 (see FIG. 2) by rotating the handle 12.

In the portable printer 1 according to the present embodiment, as described above, the user can appropriately print out the image displayed on the display D of the smartphone S while confirming whether or not the image is appropriately displayed on the display D of the smartphone S through the mirror 50.

In the portable printer 1 according to the present embodiment, the instant camera 10 is used, so that the films are not exposed as long as the films are appropriately set inside the instant camera 10.

Therefore, in the present embodiment, it is not necessary to cover the space B (see FIG. 5) between the smartphone S and the instant camera 10 in order for external light not to enter unlike the conventional portable printers, etc. as previously described in Japanese Patent Application Publication No. H11-167161 and Japanese Patent No. 4140047. As described above, there is no problem even when the external light is entered inside the device from the space B at which the observation window A, that is, the opening is formed between the smartphone S and the instant camera 10 by the supporting parts 30, 30 in the opening state of the two supporting parts 30, 30.

Further, with such case, when the external light enters into the space between the smartphone S and the instant camera 10, an image displayed on the display D of the smartphone S is deteriorated in color by the external light, so that it has possibility to occur color deterioration in the image taken by the instant camera 10 and on the image printed on the film.

However, in recent years, the illuminance of the display D of the smartphone S becomes extremely high. As a result of the continued research by the present inventor, the inventor has obtained the knowledge that as long as approximately more than half of the entire surrounding of the side surface of the space B between the smartphone S and the instant camera 10 is covered by the supporting parts 30, 30 (that is, as long as the opening as the above described observation window A is approximately less than half of the entire surrounding of the side surface of the space B), even though the external light is entered from the observation window A, an image displayed on the display D of the smartphone S can be taken by the instant camera 10 without any color deterioration. The second embodiment described below is also same, but the portable printer 1 according to the present embodiment is provided based on such knowledge.

[Second Embodiment]
[Structure of Portable Printer]

Figure 7:
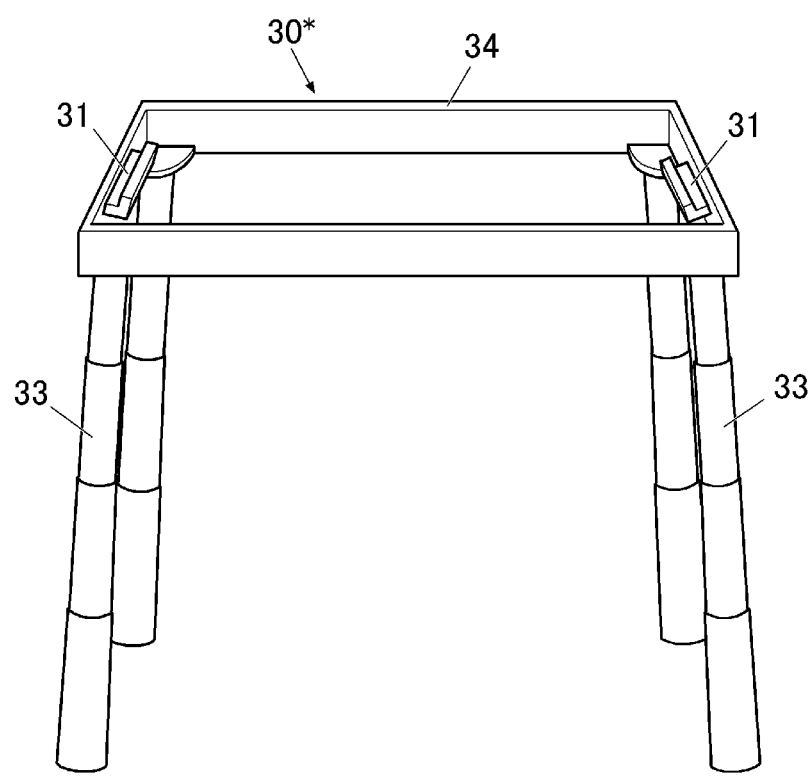
FIG. 7 is an illustration showing a multi-stage telescopic arm configuring a part of the supporting parts according to the second embodiment.

FIG. 6 is a perspective view showing a configuration of a portable printer according to the second embodiment. FIG. 7 is an illustration showing a multi-stage telescopic arm configuring a part of a supporting part (that is, supporting part 30* in a state after bellows 32 is removed).

In the explanation of each part of the portable printer 1*, the terms "up", "down", "left", "right", "front", and "back" refer to the corresponding directions in FIG. 6. Further, in the present embodiment, it will explain the members having the same configurations or functions described in the first embodiment with the same reference numerals, or the explanation may be omitted. Furthermore, in the present embodiment, as shown in FIG. 6, it will also explain a case in which the instant camera 10 is integrally installed with the installation part 20 in the portable printer 1*, but the instant camera 10 and the installation part 20 may be detachable, so that the instant camera 10 and the installation part 20 may be a separate member.

In the present embodiment, the supporting part 30* is provided with the bellows 32 shown in FIG. 6, and multi-stage telescopic arms 33 of a telescopic shown in FIG. 7, etc. That is, in the present embodiment, total four multi-stage telescopic arms 33 stand at the four corners respectively on the top surface of the installation part 20 as surrounding the instant camera 10. At the top end of the multi-stage telescopic arms 33, a rectangular member 34 including engaging parts 31 for installing the frame 40 is formed.

The bellows 32 is arranged as surrounding each of the multi-stage telescopic arms 33. The lower end of the bellows 32 is installed in the installation part 20, and the top end of the bellows 32 is installed in the rectangular member 34.

When each multi-stage telescopic arm 33 is extended to a predetermined length, it maintains the extended length. Further, when the user applies the force to them to be shortened in the lengthwise direction, they are easily shortened so as to store them on the installation part 20. Furthermore, the bellows 32 can be expanded and contracted in accordance with the extending or shortening of the multi-stage telescopic arms 33.

In the present embodiment, with such structure, when each multi-stage telescopic arm 33 is extended to a predetermined length, it maintains the extended length, so that by installing the smartphone S (the illustration of the smartphone S is omitted in FIGS. 6 and 7, and hereinafter, it is not shown as well) downwardly in the rectangular member 34, the smartphone S, of which the display D is directed downwardly, is supported by the supporting part 30*, which is provided with each multi-stage telescopic arm 33 and the bellows 32, etc., in a predetermined distance upward from the instant camera 10 (that is, a position where the instant camera 10 can focus).

In the present embodiment, instead of installing the smartphone S to the frame 40, it is possible to directly install the smartphone S to the supporting part 30* (e.g., rectangular member 34) downwardly without using the frame 40.

Further, instead of using each multi-stage telescopic arm 33, it is possible to use, for example, a link member, etc. as shown in FIG. 29 of Japanese Patent No. 4140047.

In the present embodiment, as described above, a space B between the smartphone S and the instant camera 10 is covered by the supporting part 30*, specifically, the bellows 32. In the present embodiment, as shown in FIG. 6, an observation window A is provided by cutting a part of the bellows 32 which configures the supporting part 30*. That is, in the present embodiment, the observation window A is formed in the supporting part 30* (bellows 32) itself, and the observation window A is formed between the smartphone S and the instant camera 10.

Further, in the present embodiment, in the vicinity of the instant camera 10, a mirror 50 is provided. An image displayed on the display D of the smartphone S, which is supported by the supporting part 30* (each multi-stage telescopic arm 33 and the bellows 32), is reflected on the mirror 50, so that the user can view the image reflected on the mirror 50 through the observation window A.

In this case, also, it is preferable that the mirror surface of the mirror 50 is formed as a convex surface, that is, a convex mirror. With such structure, even that the mirror 50 is relatively small, it is possible for the user to view the entire image displayed on the display D of the smartphone S (image actually in a range trimmed by the opening part 42 of the frame 40 among the image displayed on the display D of the smartphone S) by reflecting on the mirror 50.

In this way, the portable printer 1* according to the present embodiment can take an image displayed on the display D of the smartphone S, which is supported downwardly by the supporting part 30*, by the instant camera 10 and can print out the image.

The procedures in which the smartphone S is set in the portable printer 1* according to the present embodiment and an image displayed on the display D of the smartphone S is taken by the instant camera 10 and printed out are same as the procedures of the first embodiment. Also, the effects of the portable printer 1* according to the present embodiment are same as the first embodiment, so that the explanations of these point are omitted. In the present embodiment, after the frame 40 at which the smartphone S is installed was installed on the top end of the supporting part 30*, the supporting part (multi-stage telescopic arms 33 and the bellows 32, etc.) may be set by extending upwardly.

Further, in FIG. 6, it shows only a case in which the observation window A is provided on one surface of the bellows 32 (the front side surface in the drawing), but for example, the observation window A may be provided on the opposite side surface (rear-side surface in the drawing) or the right and left surfaces.

[Effect of the Invention]

As described above, according to the portable printers 1, 1* according to the first embodiment and the second embodiment, the mirror 50 is provided to reflect an image displayed on the display D of the smartphone S, which is supported by the supporting parts 30, 30* of the portable printers 1, 1*, and to view the image through the observation window A formed in the supporting part 30* (bellows 32 (see FIG. 6)) or formed between the smartphone S and the instant camera 10 formed by the supporting parts 30, 30 (see FIG. 5, etc.).

Therefore, in the conventional portable printers described in Japanese Patent Application Publication No. H11-167161 and Japanese Patent No. 4140047, the user feels inconvenience because the user cannot confirm an image displayed on the display D of the smartphone S at the time of taking the image and when printing, the first time, the user realizes that the image is not appropriately displayed on the display D of the smartphone S, so that the user has to take the image again and the printed film is wasted. According to the portable printers 1, 1* according to the first embodiment and the second embodiment, the aforementioned problem does not occur, and the user can take an image displayed on the display D of the smartphone S by the instant camera 10 while confirming whether or not the image displayed on the display D of the smartphone S is appropriately displayed, so that the film is not wasted and it can be appropriately printed. Therefore, the portable printers 1, 1* are extremely convenient for the user.

The present invention is not limited to the aforementioned embodiments, and needless to say, various modifications may be made within the scope that does not depart from the essential point of the present invention.

That is, the supporting parts of the portable printers 1, 1* are not limited to the plate shaped supporting parts 30, 30 as a lid (the first embodiment) or the supporting part 30* configuring each multi-stage telescopic arm 33 (or link member) and the bellows 32, etc. (the second embodiment). Also, other configurations may be formed as long as the smartphone S, of which the display D is directed downwardly, can be supported in a state of separating upwardly from the instant camera 10 with a predetermined distance, and the space B between the smartphone S and the instant camera 10 can be covered (that is, the external light entering the space B is properly shielded).

Further, for example, in the first embodiment (see FIG. 1, etc.) or the second embodiment (see FIGS. 6 and 7), it explains that the mirror 50 is arranged in one side (front side in the drawing) of the instant camera 10, but the mirror 50 may be arranged in the opposite side (rear-side in the drawing) of the instant camera 10, etc., so that multiple mirrors 50 may be provided.

According to the aforementioned portable printer, a mirror is provided to reflect and view an image displayed on a display of a portable electronic device such as a smartphone, etc., which is supported by a supporting part, by the user, so that the image displayed on the display can be appropriately printed while the user confirms whether the image is appropriately displayed on the display of the portable electronic device.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A portable printer comprising:
   a camera;
   a printing part;

a supporting part being configured to support a portable electronic device including a display, in a way in which the display faces the camera with a predetermined distance away from the camera, the supporting part being configured to cover a space between the portable electronic device and the camera; and a mirror being configured to reflect an image on the display and form reflected image thereon, the reflected image on the mirror being viewable by a user, the camera being configured to capture the image on the display, the printing part being configured to print the image captured by the camera.

2. A portable printer comprising:
a camera;
a printing part;
an installation part to which the camera is installed;
a supporting part being configured to support a portable electronic device including a display in a way in which the display faces the camera with a predetermined distance away from the camera, the camera being configured beneath the portable electronic device, the supporting part being configured to cover a space between the portable electronic device and the camera; and
a mirror being configured to reflect an image on the display and form a reflected image thereon, the reflected image on the mirror being viewable by a user,
the camera being configured to capture the image on the display,
the printing part being configured to print the image captured by the camera.

3. The portable printer according to claim 2, wherein
the camera and the printing part are formed in a unified manner, and
the camera and the printer are installed in the installation part.

4. The portable printer according to claim 3, further comprising
a shutter button being configured at the installation part for the user to operate a shutter function of the camera.

5. The portable printer according to claim 2, wherein the supporting part is foldable.

6. The portable printer according to claim 5, wherein the supporting part is configured to cover the installation part from a top thereof when the supporting part is folded.

7. The portable printer according to claim 2, wherein a surface of the mirror is convex.

8. The portable printer according to claim 2, further comprising:
a first frame including a first opening part, wherein
the first frame is supported by the supporting part, and
the first frame is configured to trim the image on the display.

9. The portable printer according to claim 8, wherein
the frame includes an adhering part, and
the portable electronic device is attached to the frame at the adhering part.

10. The portable printer according to claim 8, wherein
the supporting part is foldable and
the frame is configured to be stored between the installation part and the supporting part when the supporting part is folded.

11. The portable printer according to claim 8, further comprising:
a second frame including a second opening part, wherein
at least one of a shape and a size of the second opening is different respectively from a shape and a size of the first opening.

* * * * *